United States Patent
Lv et al.

(10) Patent No.: US 11,313,485 B2
(45) Date of Patent: Apr. 26, 2022

(54) ELECTRIC VALVE AND MANUFACTURING METHOD THEREOF

(71) Applicant: ZHEJIANG SANHUA CLIMATE AND APPLIANCE CONTROLS GROUP CO., LTD., Zhejiang (CN)

(72) Inventors: Ming Lv, Zhejiang (CN); Jiancheng Zhi, Zhejiang (CN); Damai Yang, Zhejiang (CN)

(73) Assignee: ZHEJIANG SANHUA CLIMATE AND APPLIANCE CONTROLS GROUP CO., LTD, Zhejiang (CN)

( * ) Notice: Subject to any disclaimer, the term of this patent is extended or adjusted under 35 U.S.C. 154(b) by 0 days.

(21) Appl. No.: 16/769,294

(22) PCT Filed: May 17, 2018

(86) PCT No.: PCT/CN2018/087276
§ 371 (c)(1),
(2) Date: Jun. 3, 2020

(87) PCT Pub. No.: WO2019/148693
PCT Pub. Date: Aug. 8, 2019

(65) Prior Publication Data
US 2021/0172543 A1 Jun. 10, 2021

(30) Foreign Application Priority Data
Jan. 31, 2018 (CN) .......................... 201810099367.1

(51) Int. Cl.
*F16K 31/04* (2006.01)
*F16K 27/02* (2006.01)
(Continued)

(52) U.S. Cl.
CPC ............ *F16K 31/047* (2013.01); *B21D 22/02* (2013.01); *B23P 15/001* (2013.01); *F16K 1/465* (2013.01); *F16K 27/029* (2013.01)

(58) Field of Classification Search
CPC ...... F16K 31/047; F16K 31/50; F16K 31/508; F16K 27/029; F16K 1/48–487
(Continued)

(56) References Cited

U.S. PATENT DOCUMENTS 7,900,888 B2 * 3/2011 Weldon .................. F16K 31/04
251/273
10,352,467 B2 7/2019 Lv et al.

FOREIGN PATENT DOCUMENTS

CN 103836211 A * 6/2014 ............ F16K 27/02
CN 104565392 A 4/2015
(Continued)

OTHER PUBLICATIONS

International Search Report dated Nov. 1, 2018 for PCT application No. PCT/CN2018/087276.
(Continued)

*Primary Examiner* — Seth W. Mackay-Smith
(74) *Attorney, Agent, or Firm* — Ohlandt, Greeley, Ruggiero and Perle, LLP

(57) ABSTRACT

Provided is an electric valve and a manufacturing method thereof. The electric valve includes a valve body member, a valve seat member, a transmission member, a valve core member and a nut. The valve core member includes an upper tubular body including a first cavity, a valve core body and a connecting member. The valve core body is roughly in a round tubular shape and includes an annular thin wall portion and a second cavity. The connecting member includes a first axial through hole, and the upper end portion of the connecting member includes a lower stop portion. The
(Continued)

annular thin wall portion is capable of abutting against a sealing portion of the valve seat member. A lower end portion of the nut is engageable with the lower stop portion to limit downward movement of the nut.

17 Claims, 8 Drawing Sheets

(51) Int. Cl.
     *B21D 22/02*      (2006.01)
     *F16K 1/46*      (2006.01)
     *B23P 15/00*      (2006.01)

(58) Field of Classification Search
     USPC .................................... 251/129.11, 129.12
     See application file for complete search history.

(56) References Cited

FOREIGN PATENT DOCUMENTS

| | | | |
|---|---|---|---|
| CN | 104791536 A | | 7/2015 |
| JP | 201313027 A | | 7/2013 |
| JP | 2016540933 A | | 12/2016 |
| JP | 2017180525 A | | 10/2017 |
| JP | 2017223372 A | * | 12/2017 |
| JP | 2017223372 A | | 12/2017 |

OTHER PUBLICATIONS

Japanese Office Action dated Aug. 25, 2021 for Japanese Appl. No. 2020-534619.

\* cited by examiner

ELECTRIC VALVE AND MANUFACTURING METHOD THEREOF

This application is the national phase of International Application No. PCT/CN2018/087276, titled "ELECTRIC VALVE AND MANUFACTURING METHOD THEREOF", filed on May 17, 2018, which claims the benefit of Chinese Patent Application No. 201810099367.1, titled "ELECTRIC VALVE AND MANUFACTURING METHOD THEREOF", filed with the China National Intellectual Property Administration on Jan. 31, 2018, the entire disclosures of which are incorporated herein by reference.

FIELD

The present application relates to the technical field of fluid control, and in particular to an electric valve and a method for manufacturing the electric valve.

BACKGROUND

For some air conditioners, especially in commercial air conditioning systems such as multi-split air conditioning systems, an outdoor unit is required to be in communication with multiple indoor units, therefore, the refrigerant circuit of each indoor unit is required to be equipped with an electric valve for cutting off the refrigerant or regulating the flow of the refrigerant. A technical problem that those skilled in the art are making constant efforts to solve is to improve the motion performance of the electric valve.

SUMMARY

An object of the present application is to provide an electric valve, which can reduce the differential pressure force experienced by a valve core member and improve the motion performance of the electric valve.

The electric valve disclosed in the present application includes:

a valve body member, wherein the valve body member includes a valve body, and the valve body is provided with a first fluid port;

a valve seat member, wherein the valve seat member is fixedly connected to the valve body member, the valve seat member includes a valve seat body, and the valve seat body is provided with a second fluid port;

a transmission member, wherein the transmission member is arranged in a valve chamber of the electric valve, the transmission member includes a screw rod and a nut, and the screw rod is in threaded connection with the nut;

a valve core member, wherein the valve core member is arranged in the valve chamber, and the valve core member includes an upper cylindrical body, a valve core body, and a connecting member fixedly connected with the upper cylindrical body and the valve core body; and wherein the upper cylindrical body includes a first chamber, and an upper end portion of the upper cylindrical body includes an upper stop portion; the valve core body is substantially tubular-shaped and includes an annular thin-wall portion. The valve core body further includes a second chamber, an upper end portion of the connecting member faces the first chamber, and a lower end portion of the connecting member faces the second chamber. The nut includes a radial protruding portion arranged in the first chamber, and the radial protruding portion can cooperate with the upper stop portion, so that the nut can drive the valve core member to move in an axial direction. The connecting member is provided with a first axial through hole in communication with the first chamber and the second chamber, the upper end portion of the connecting member includes a lower stop portion, the annular thin-wall portion can abut against a sealing portion of the valve seat member, and a lower end portion of the nut can cooperate with the lower stop portion, to prevent the nut from moving downward.

According to the electric valve of the present application, the valve core member includes the valve core body axially running through the upper cylindrical body and being substantially tubular-shaped, and the connecting member configured for connecting the upper cylindrical body and the valve core body. The connecting member is provided with the first axial through hole which is in communication with the first chamber and the second chamber. The valve core body includes the annular thin-wall portion which can reduce the differential pressure force born by a valve core member, facilitate the pressure balance inside the electric valve, and improve the motion performance of the electric valve.

A method for manufacturing the electric valve having the above functions is further provided according to the present application, including the following steps:

S1, providing the upper cylindrical body: forming the hollow upper cylindrical body by using an integral forming method of drawing or stamping a metal material, wherein the upper end portion of the upper cylindrical body includes the first axial through hole and the upper stop portion;

S2, assembling the nut, the upper cylindrical body and the connecting member: allowing the radial protruding portion to be limited in the first chamber by the upper stop portion, and fixing a lower end portion of the upper cylindrical body to the connecting member by riveting or welding;

S3, providing the valve core body and a seal assembly, wherein the valve core body includes a small-diameter portion and the annular thin-wall portion arranged below the small-diameter portion, the small-diameter portion is substantially tubular-shaped, and an inner diameter and an outer diameter of the annular thin-wall portion are greater than an inner diameter and an outer diameter of the small-diameter portion, respectively; sleeving the seal assembly on a peripheral portion of the small-diameter portion, and fixing an upper end portion of the small-diameter portion to the connecting member by welding;

S4, providing a guide sleeve, and fixing the guide sleeve to the valve body by welding, to form a second fitting assembly;

S5, connecting the nut with the screw rod by threaded connection, and fixing a lower end portion of the guide sleeve to the seal assembly by riveting or welding;

S6, providing a valve seat core having the sealing portion and the valve seat body made of a metal material, wherein an upper end face portion of the valve seat body is machined to form an upper positioning stepped portion having a stepped face facing upward, and the upper positioning stepped portion is configured for mounting the valve seat core; and mounting the valve seat core at the upper positioning stepped portion and fixing the valve seat core to an upper end of the valve seat body by riveting; and S7, fixing the valve body with the valve seat body by welding.

DETAILED DESCRIPTION OF EMBODIMENTS

Figure 1:
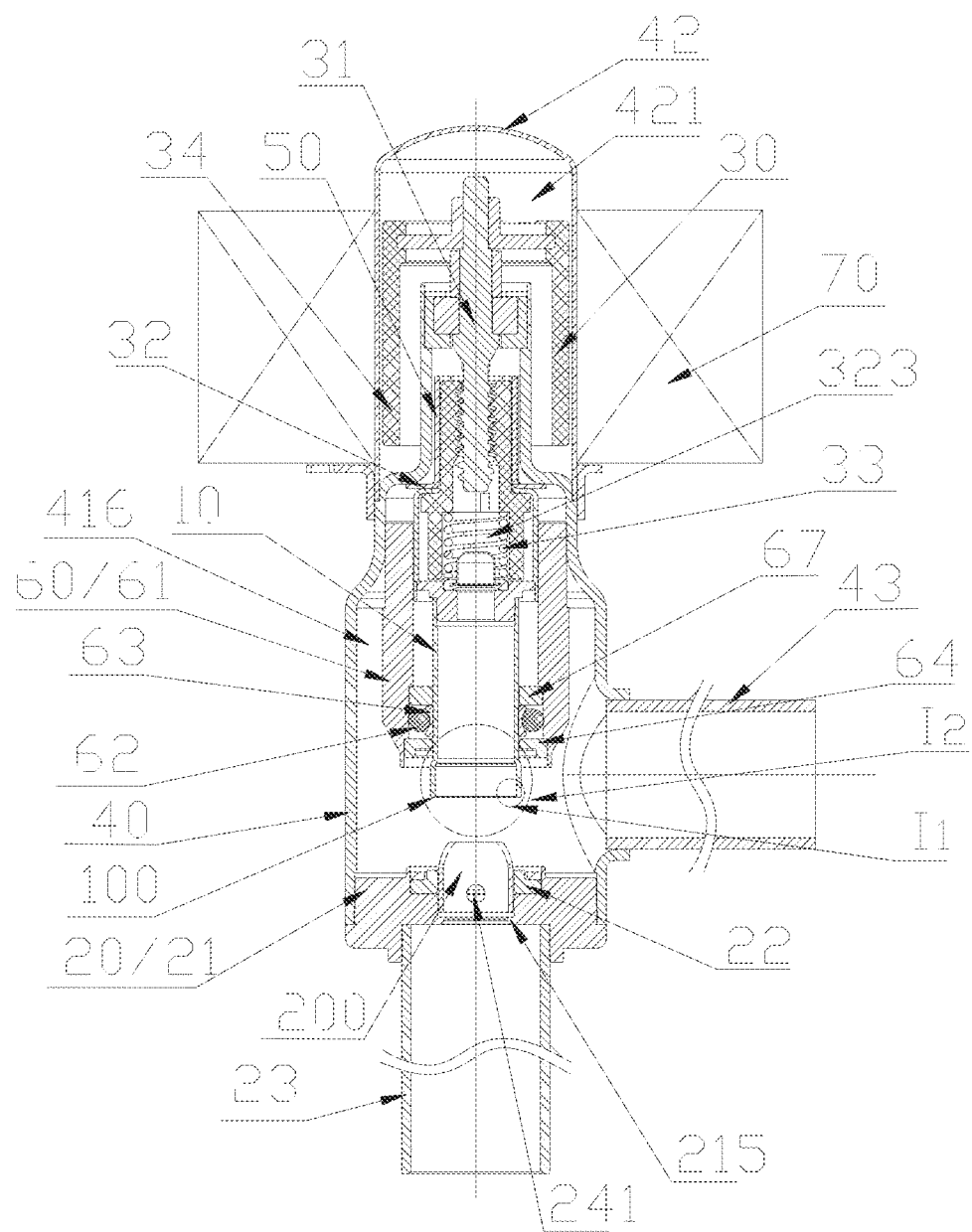
FIG. 1 is a schematic structural view of an electric valve according to a first embodiment of the present application in a fully opened state.

For those skilled in the art to better understand technical solutions of the present application, the present application will be further described in detail in conjunction with drawings and specific embodiments hereinafter.

It should be noted that the orientation terms in the present application such as "up" and "down" are defined in the case that the components are in the positions shown in the drawings, which are only used for clear and convenient expression of the technical solutions. It should be understood that the orientation terms herein should not limit the scope of protection of the present application.

The "axial direction" as described in the present application refers to a direction from top to bottom or from bottom to top along a paper surface, which is equivalent to an axial direction of a rotor. The "radial direction" as described in the present application refers to a direction perpendicular to the axial direction. The expression "open or close the valve port" as described in the present application refers to that a fluid at the valve port is allowed to flow between an axial connecting pipe and a radial connecting pipe or not. The expression "integrally formed" as described in the present application means being made by forming one workpiece rather than assembling or fixing two or more workpieces together. The "thin wall" as described in the present application refers to a wall having a thickness between 0.3 mm and 2.0 mm, that is, if the wall thickness is defined as M, then 0.3 mm M 2.0 mm.

Figure 2:
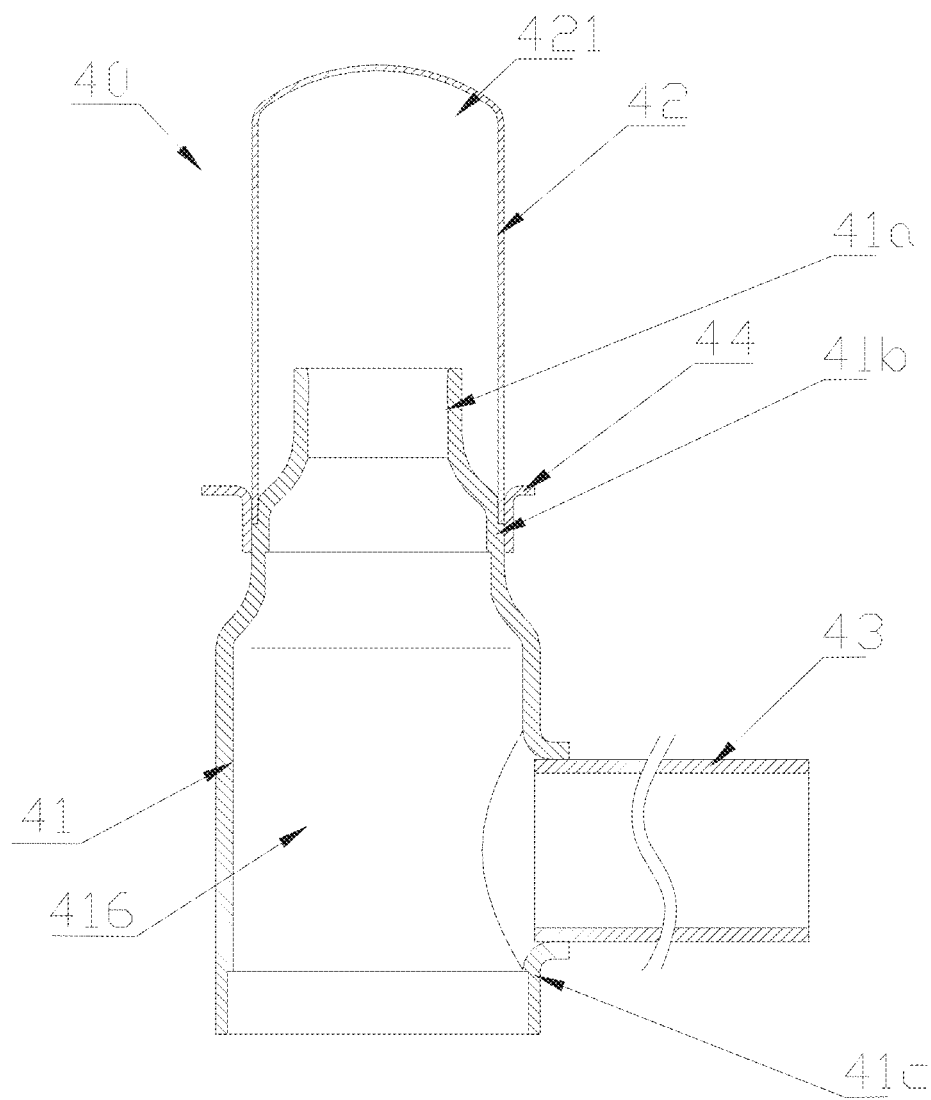
FIG. 2 is a schematic structural view of a valve body member of the electric valve shown in FIG. 1.
Figure 3:
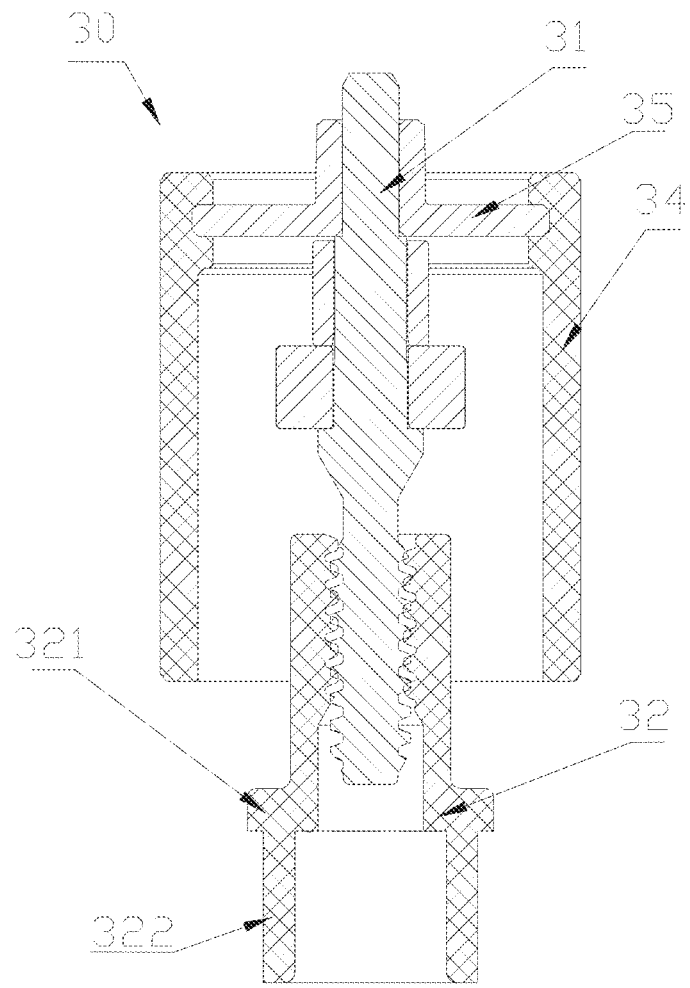
FIG. 3 is a schematic structural view of a transmission member of the electric valve shown in FIG. 1.
Figure 4:
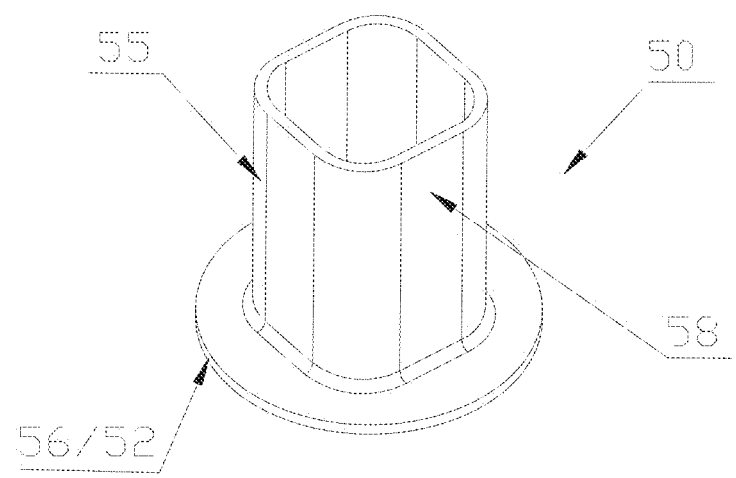
FIG. 4 is a perspective view of a nut sleeving member of the electric valve shown in FIG. 1.
Figure 5:
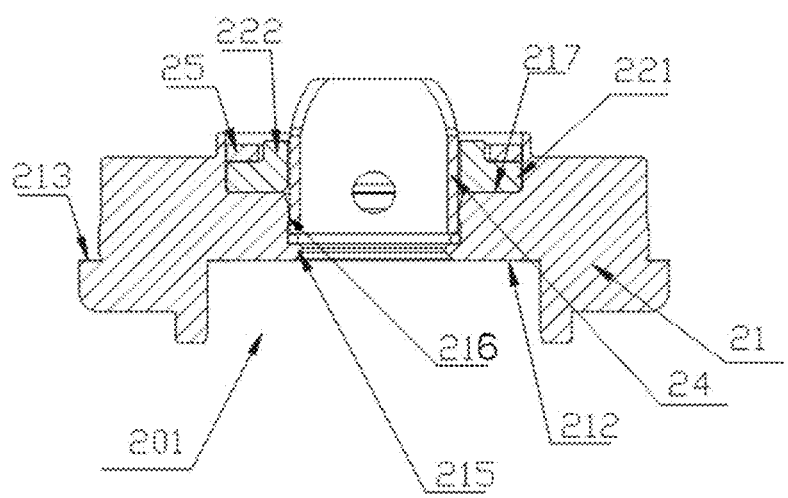
FIG. 5 is a schematic structural view of a valve seat member shown in FIG. 1.
Figure 6A:
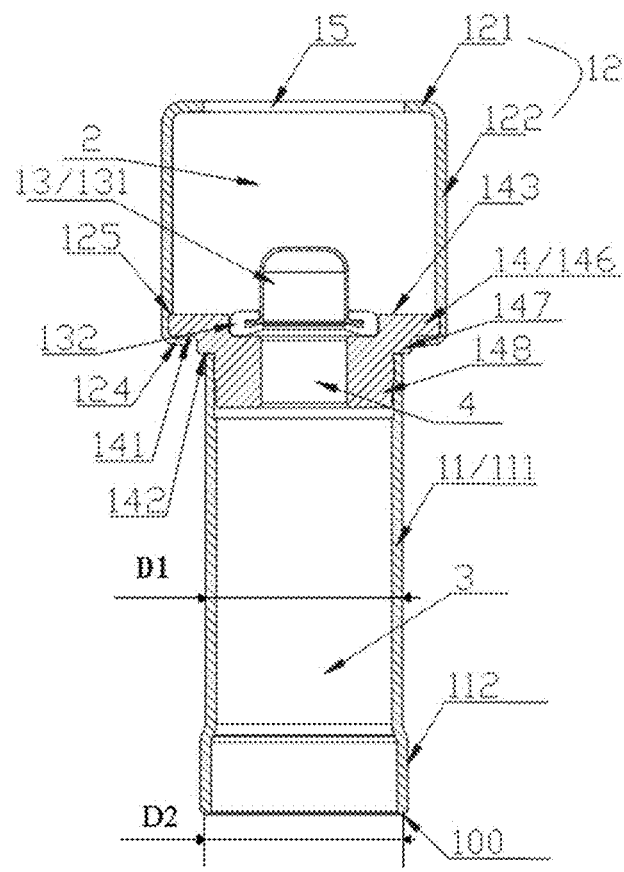
FIG. 6A is a schematic structural view of a valve core member shown in FIG. 1.
Figure 6B:
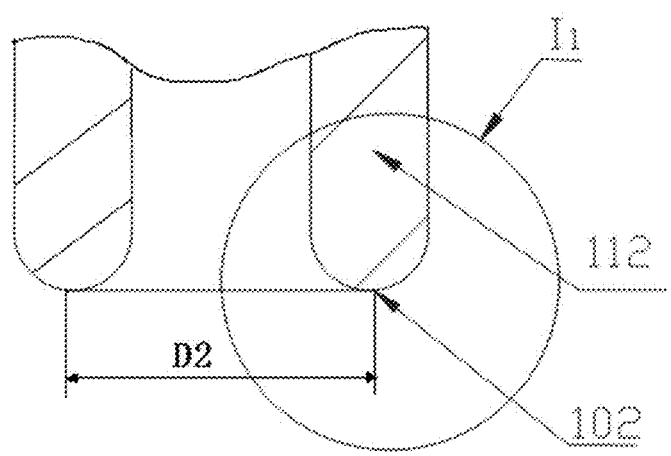
FIG. 6B is a partially enlarged view showing a portion $I_1$ in FIG. 1.
Figure 6C:
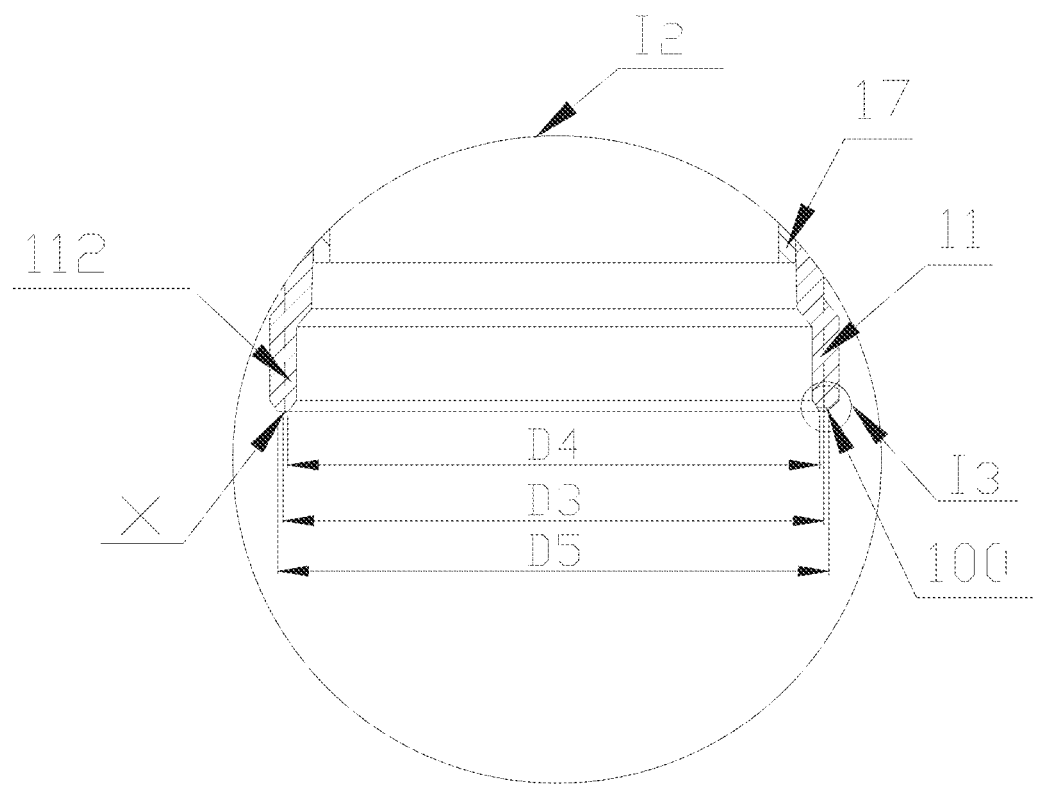
FIG. 6C is a schematic structural view showing another embodiment of 12 in FIG. 1.
Figure 6D:
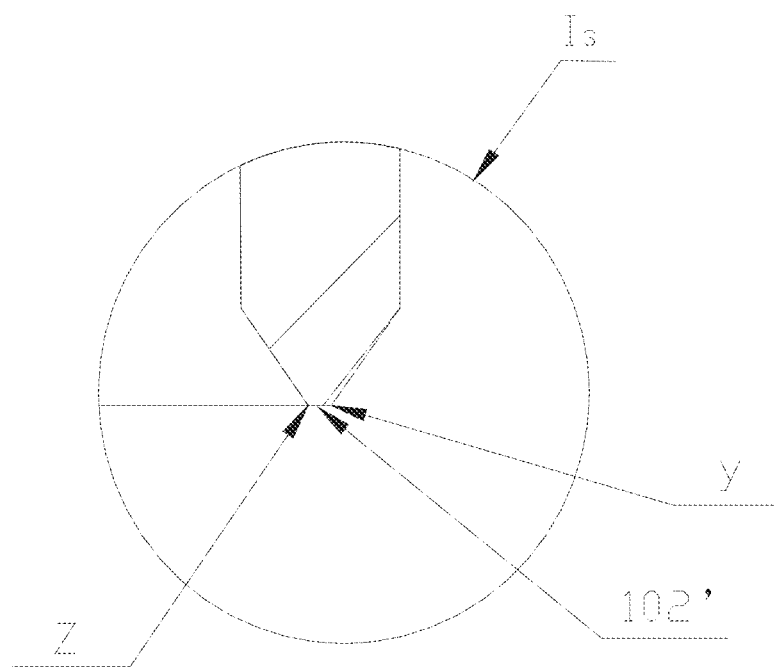
FIG. 6D is a partially enlarged view showing a portion 13 in FIG. 6C.
Figure 7:
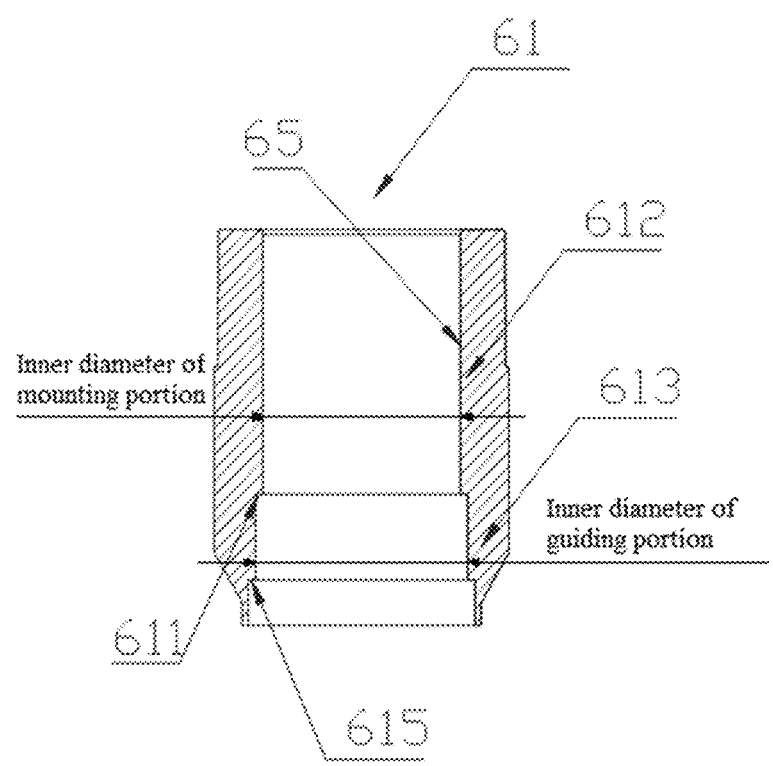
FIG. 7 is a schematic structural view of a guide sleeve of the electric valve shown in FIG. 1.

FIG. 1 is a schematic structural view of an electric valve according to a first embodiment of the present application in a fully opened state; FIG. 2 is a schematic structural view of a valve body member of the electric valve shown in FIG. 1; FIG. 3 is a schematic structural view of a transmission member of the electric valve shown in FIG. 1; FIG. 4 is a perspective view of a nut sleeving member of the electric valve shown in FIG. 1; FIG. 5 is a schematic structural view of a valve seat member shown in FIG. 1; FIG. 6A is a schematic structural view of a valve core member shown in FIG. 1; FIG. 6B is a partially enlarged view showing a portion $I_1$ in FIG. 1; FIG. 6C is a schematic structural view showing another embodiment of $I_2$ in FIG. 1; FIG. 6D is a partially enlarged view showing a portion 13 shown in FIG. 6C; and FIG. 7 is a schematic structural view of a guide sleeve of the electric valve shown in FIG. 1.

As shown in FIGS. 1 and 2, the electric valve according to the present solution includes a valve core member 10, a valve seat member 20, a transmission member 30, a valve body member 40, a nut sleeving member 50, a valve core guide member 60 and a coil member 70.

Specifically, the valve body member 40 includes a valve body 41 and a valve hood 42 which are fixedly connected to each other by welding. The coil member 70 is sleeved on a periphery of the valve hood 42 and is fixedly connected to the valve body member 40 via a bracket 44.

The valve body 41 is substantially a cylindrical structure, which is convenient to be manufactured by using methods such as pressing, stamping, rolling or extrusion molding in a specific forming process, the forming process is simple and the manufacture efficiency is high. The valve body 41 is substantially a three-section structure which specifically includes an upper cylinder portion 41a, an intermediate cylinder portion 41b, and a lower cylinder portion 41c. A peripheral diameter of the upper cylinder portion 41a is the smallest, a peripheral diameter of the intermediate cylinder portion 41b is greater than the peripheral diameter of the upper cylinder portion 41a, and a peripheral diameter of the lower cylinder portion 41c is relatively greatest. Such arrangement is convenient for mounting functional members inside the valve body 41 and mounting components outside the valve body 41 by welding, so that the structure is more compact. A radial connecting pipe 43 is fixed to the lower cylinder portion 41c of the valve body 41 by welding. The valve hood 42 is fixed to an outer wall of the intermediate cylinder portion 41b of the valve body 41 by welding, the valve hood 42 includes a valve hood inner chamber 421, and the upper cylinder portion 41a of the valve body 41 extends into the valve hood inner chamber 421. It can be understood that, the valve hood 42 can also be indirectly fixed to the valve body 41 by a welded joint. Other following components can also be indirectly fixed by using a welding means, which is not discussed in further detail herein. It can be further understood that, on the premise of meeting the assembly requirements, the valve body 41 may be of a structure that the peripheral diameter of the intermediate cylinder portion 41b is equal to the peripheral diameter of the lower cylinder portion 41c, that is, the valve body 41 is substantially a two-section structure.

As shown in FIGS. 1 and 3, the transmission member 30 is arranged in a valve chamber, and the transmission member 30 includes a magnetic rotor 34, a screw rod 31 and a nut 32. There's no relative displacement between the screw rod 31 and the valve hood 42 in the axial direction. The magnetic rotor 34 is arranged in the valve hood inner chamber 421, the magnetic rotor 34 is fixedly connected to the screw rod 31 through a connecting piece 35, and a lower end of the screw rod 31 extends into the valve body and is in threaded connection with the nut 32. In a large-flow electric valve, the screw rod 31 and the nut 32 are connected via non-self-locking threaded connection, which is beneficial for avoiding hidden dangers such as clamping and the like.

The screw rod 31 and the valve hood 42 do not move with respect to each other in the axial direction, and the magnetic rotor 34 is fixedly connected with the screw rod 31, therefore, the magnetic rotor 34, the screw rod 31, the valve body member 40 and the coil member 70 do not move with respect to one another in the axial direction. During operation, a driving force of the coil member 70 will not change with an axial movement of the valve core member 10, for a valve port having a certain size, a smaller-sized motor can be used, which facilitates miniaturization of the product.

The nut 32 is able to drive the valve core member 10 to move up and down in the axial direction. The nut 32 includes a radial protruding portion 321 that supports the valve core member 10 to drive the valve core member 10 to move upward in the axial direction. Since the magnetic rotor 34, the screw rod 31, the valve body member 40 and the coil member 70 do not move with respect to one another in the axial position, when the magnetic rotor 34 rotates under the action of the driving force of the coil member 70, the screw rod 31 rotates circumferentially together with the magnetic rotor 34, circumferential rotation of the screw rod 31 is converted into an axial movement of the nut 32, thereby causing the nut 32 to drive the valve core member 10 to move in the axial direction, so as to open or close the electric valve.

In order to ensure that the nut 32 is able to convert the rotation of the screw rod 31 into the axial movement to drive the valve core member 10 to move in the axial direction, as shown in FIGS. 1 and 5, a nut sleeving member 50 fitting with the nut 32 is arranged between the valve body 41 and the nut 32, to limit circumferential rotation of the nut 32, and the nut sleeving member 50 is fixed to an inner wall of the valve body 41 by welding. An outer peripheral wall of a portion of the nut 32 fitting with the nut sleeving member 50 is a columnar structure having a non-circular cross section. The nut sleeving member 50 includes a nut-limiting portion 51 fitting with the nut 32 for limiting the rotation of the nut 32, and a valve-core-limiting portion 52 for limiting an upward moving distance of the valve core member 10. After the nut 32 drives the valve core member 10 to move upward in the axial direction to a position where the valve core member 10 abuts against the valve-core-limiting portion 52, the valve core member 10 is unable to move upward. In a specific design of the present solution, the nut sleeving member 50 is made of a metal plate such as a steel plate by stamping and flanging, and includes a tube-shaped portion 55 and a plate-like portion 56 formed by bending a lower end portion of the tube-shaped portion 55 outwardly. An inner wall of the tube-shaped portion 55 includes at least one plane segment 58 extending in the axial direction. The circumferential rotation of the nut 32 is limited by fitting between the plane segment 58 and a peripheral portion of the nut 32. In this solution, a cross section of the inner wall of the tube-shaped portion 55 is substantially a square structure provided with arc transitions between four edges thereof, that is, in the specific embodiment, four plane segments 58 are provided for limiting the circumferential rotation of the nut 32. In the specific embodiment, the plate-like portion 56 of the nut sleeving member 50 is welded with an inner edge of the intermediate cylinder portion of the valve body 41, thus making the overall structure simple. The nut sleeving member 50 can also be formed by forming the tube-shaped portion 55 and the plate-like portion 56 respectively, and then fixing the above two portions by welding. The plate-like portion 56 serves as the valve-core-limiting portion for limiting a maximum distance that the valve core member 10 moves upward in the axial direction. That is, by providing the nut sleeving member 50 having a simple structure, dual functions of preventing the circumferential rotation of the nut 32 and limiting the valve core member 10 in the axial direction are achieved.

As shown in FIG. 1, the valve seat member 20 is fixed to a lower opening portion of the valve body 41 by welding, and thus the valve chamber 416 is formed. The valve seat member 20 includes a valve seat body 21, a valve seat core 22 and a valve port sheath 24. The valve seat body 21 is provided with a through hole in the axial direction thereof. An upper end of the valve seat body 21 includes a valve port 200, and a lower end of the valve seat body 21 includes a second fluid port 201. An outer wall of the valve seat body 21 is provided with an outer stepped portion 213 having a stepped face facing the lower cylinder portion 41c of the valve body 41, and the lower cylinder portion 41c of the valve body 41 abuts against the stepped face of the outer stepped portion 213 and is fixed thereto by welding.

A center of the valve seat body 21 is provided with a third axial through hole 216, an inner wall of the valve seat body 21 is provided with an upper stepped portion 217 having an inner bottom face facing upward, and the valve seat core 22 is arranged on the upper stepped portion 217. The valve seat core 22 can be made of a flexible non-metallic material such as a plastic material, which is beneficial for ensuring sealing performance between the valve seat core 22 and the valve core member 10 made of metal (a steel plate in the present embodiment). The valve seat core 22 is substantially in the shape of a Chinese character ""凸"" and has a central through hole, and a cross section of the valve seat core 22 is ring-shaped. The valve seat core 22 includes a ring-shaped base portion 221 and a ring-shaped protrusion extending upward with respect to tan upper end face of the base portion 221, an outer diameter of the protrusion is less than an outer diameter of the base portion, and an upper end face of the protrusion forms a sealing portion 222. A stepped portion is formed by the sealing portion 222 and the base portion 221, and a valve port pressing sheet 25 is provided on the stepped portion. When the valve seat body 21 is machined, a raised portion 214 (the raised portion 214 shown in FIG. 1 is in a state before riveting) is machined at an upper end portion of the valve seat body 21. When the product is assembled, the raised portion 214 is riveted, to allow the valve port pressing sheet 25 to abut against the stepped portion of the valve seat core 22, thereby achieving the mounting and positioning of the valve seat core 22. The valve port sheath 24 is arranged at an inner side of the valve seat core 22, to further ensure the mounting and positioning of the valve seat core 22 together with the valve port pressing sheet 25.

As shown in FIG. 1, in the present solution, the valve seat body 21 includes a radial protruding portion 215 protruding in a radial direction thereof. The valve port sheath 24 is an annular thin-wall cylindrical member, the valve port sheath 24 is sleeved inside the third axial through hole 216, an outer wall of the valve port sheath 24 abuts against the inner wall of the valve seat body 21 and an inner wall of the valve seat core 22 and is fixed to the inner wall of the valve seat body 21 by welding. After a lower end of the valve port sheath 24 abuts against the radial protruding portion 215, the valve port sheath 24 is fixed to the valve seat body 21 by welding. The inner wall of the valve seat body 21 is further provided with a lower stepped portion 212 having an inner bottom face facing downward. An axial connecting pipe 23 abuts against the lower stepped portion 212 for positioning and is fixed to the valve seat body 21 by welding. The valve port sheath 24 may protrude out of the sealing portion 222 of the valve seat core 22 in the axial direction, at the moment when the annular thin-wall portion 112 of the valve core member 10 leaves the sealing portion 222 of the valve seat core 22 to open the valve port 200, a portion of the valve port sheath 24 which is higher than the sealing portion 222 can block the instantaneous impact of the high pressure fluid, so that the valve opening process is stable.

A balance hole in communication with an inner chamber of the valve port sheath 24 is provided at a position of the valve port sheath 24 corresponding to a stepped face of the upper stepped portion 217, and the balance hole functions as a radial balance channel 241. The purpose of such arrangement is as follows. During the operation of the electric valve, a part of medium may enter and remain between a bottom of the valve seat core 22 and the stepped face of the upper stepped portion 217 of the valve seat body 21, and when the electric valve is being opened or closed, abnormal fluctuations such as instantaneous vaporization of the medium may occur due to an instantaneous change of pressure, causing the valve seat core 22 to depart from the valve seat body 21 and thereby resulting in failure of the product. By providing the balance hole 241, the medium at the bottom of the valve seat core 22 can be kept in communication with an inner chamber of the axial connecting pipe 23, so that the above situation can be avoided.

In the present solution, the components of the valve seat member are mounted and fitted compactly, the accuracy of mutual positions of the components can be ensured, the manufacturing process is simple, and the reliability of the product is high.

The valve core member 10 configured to be in contact with or separated from the valve seat member 20 is arranged in the valve chamber 416, and the valve port 200 is closed or opened by controlling the valve core member 10 to be abut against or separated from the valve seat member 20.

As shown in FIGS. 1 and 6A, the valve core member 10 includes an upper cylindrical body 12, a valve core body 11 which is substantially cylindrical-shaped and a connecting member 14 connecting the upper cylindrical body 12 and the valve core body 11. Specifically, the upper cylindrical body 12 is an integral structure, and the upper cylindrical body 12 is formed by drawing or stamping a metal material. In order to simplify the forming process, the upper cylindrical body 12 may be formed by integrally drawing or integrally stamping the metal material. For example, the upper cylindrical body 12 is integrally formed by stamping a welded steel pipe or drawing a steel plate. The forming process is simple, and the cost is saved. The upper cylindrical body 12 includes a first chamber 2, an upper end portion of the upper cylindrical body 12 includes an upper stop portion, a second axial through hole 15 is formed by an inner edge of the upper stop portion, the nut 32 is arranged to run through the second axial through hole 15, the radial protruding portion 321 of the nut 32 is arranged in the first chamber 2 and can cooperate with the radial protruding portion 321 of the nut 32, to enable the nut 32 to drive the valve core member to move in the axial direction, and the second axial through hole 15 is in communication with the first chamber 2. More specifically, as shown in FIG. 6A, the upper cylindrical body 12 includes a body portion 121 which is in a shape of a straight cylinder and a transverse bending portion 121 extending radially from an upper end of the body portion 121, a lower end face portion of the transverse bending portion 121 functions as the upper stop portion, and the second axial through hole 15 is formed by an inner wall of the transverse bending portion 121. Of course, it can be understood according to the present application that, the formation of the upper stop portion is not limited hereto, for example, the upper stop portion may also be formed by welding an upper stop member to the body portion 122 of the upper cylindrical body 12.

The valve core body 11 is substantially tubular-shaped, the valve core body 11 is an integral structure having a second chamber 3, and the valve core body 11 is formed by drawing or stamping a metal material. In order to simplify the forming process, the valve core body may be formed by integrally drawing or integrally stamping the metal material. For example, the valve core body may be integrally formed by stamping a welded steel pipe or drawing a steel plate. The forming process is simple, and the cost is saved. The valve core body 11 includes an annular thin-wall portion 112 which is able to abut against or be separated from the sealing portion 222 of the valve seat core 22. In a case that the annular thin-wall portion 112 is separated from the sealing portion 222, a first fluid port 401, the valve port 200, and the second fluid port 201 are in communication with one another. In a case that the annular thin-wall portion 112 abuts against the sealing portion 222, the first fluid port 401 is not in communication with the second fluid port 201. By providing the annular thin-wall portion 112, a differential pressure force borne by the valve core member 10 can be reduced, which facilitates a pressure balance inside the electric valve, and thereby improving the motion performance of the electric valve.

As shown in FIG. 6A, an outer diameter of the upper cylindrical body 12 is greater than an outer diameter of the valve core body 11, that is, the upper cylindrical body 12 is larger than the valve core body 11 in the radial direction. The connecting member 14 is substantially a cylindrical-shaped structure having an upper portion with a relatively large diameter and a lower portion with a relatively small diameter, an upper end portion of the connecting member faces the first chamber 2 and includes a lower stop portion 143. In a case that the annular thin-wall portion 112 abuts against the sealing portion 222, a lower end portion of the nut 32 is able to cooperate with the lower stop portion, to prevent the nut 32 from moving downward. The lower end portion of the connecting member faces the second chamber 3, the connecting member 14 has a first axial through hole 4, and a cross section of the connecting member 14 is ring-shaped. The first chamber 2 and the second chamber 3 are in communication with each other via the first axial through hole 4. The connecting member 14 is machined by metal cutting, which includes an upper section 146, an intermediate section 147 and a lower section 148, an outer diameter of the upper section 146 is greater than an outer diameter of the intermediate section 147, and the outer diameter of the intermediate section 147 is greater than an outer diameter of the lower section 148. At an outer wall of the connecting member 14, a third positioning stepped portion 141 having a stepped face facing downward is defined by the upper section 146 and the intermediate section 147, and a fourth positioning stepped portion 142 having a stepped face facing downward is defined by the intermediate section 147 and the lower section 148. An inner wall of the upper cylindrical body 12 is provided with an inner stepped portion 125 having a stepped face facing downward, and a lower end of the body portion 122 is provided with a lower pressing portion 124. After the upper end portion of the connecting member 14 abuts against the inner stepped portion 125, the lower pressing portion 124 is riveted to the third positioning stepped portion 141 or welded to the third positioning stepped portion 141, and thus the fixed connection between the upper cylindrical body 12 and the connecting member 14 is realized. An upper end of the valve core body 11 is sleeved on a peripheral portion of the lower section 148 and is fixed with the lower section 148 by welding after the upper end of the valve core body 11 abuts against the fourth positioning stepped portion 142 of the connecting member 14.

Figure 8:
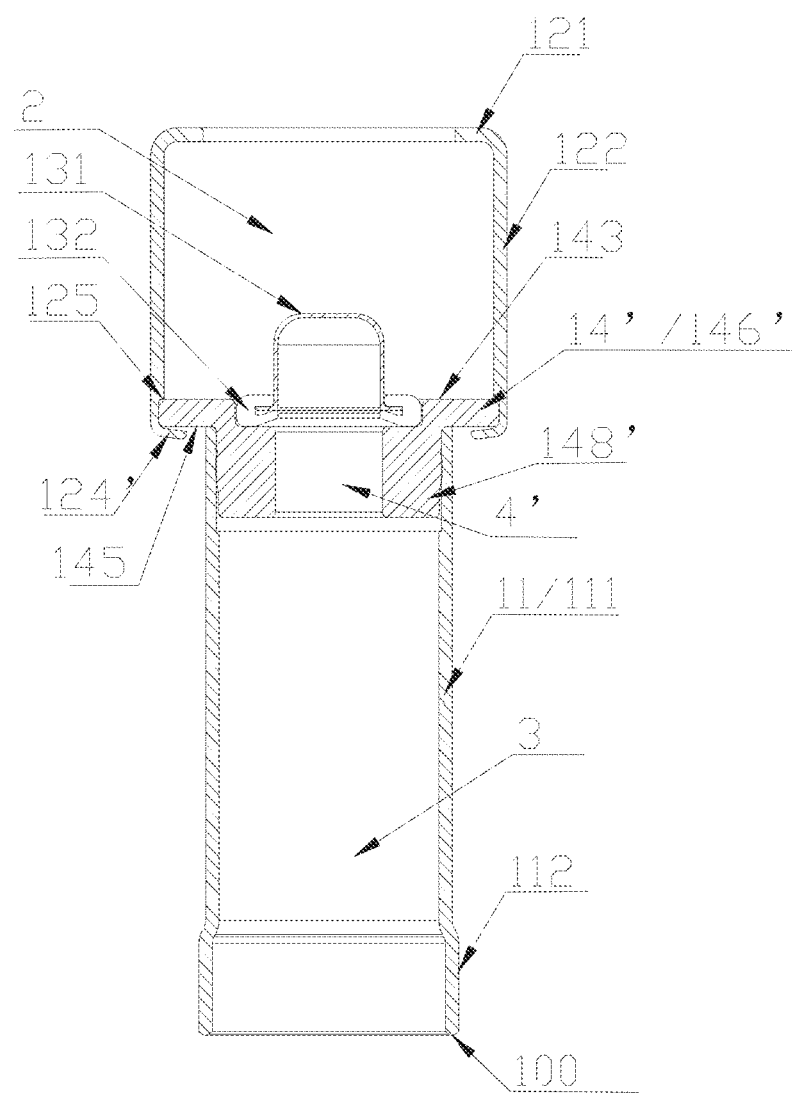
FIG. 8 is a schematic structural view showing a modified embodiment of the valve core member in FIG. 1.

A modified design of the structure of the connecting member and the connecting manner between the connecting member, the upper cylindrical body 12 and the valve core body 11 as shown in FIG. 8 may also be employed. FIG. 8 is a schematic structural view of a modified embodiment of the valve core member shown in FIG. 1. Differences between the valve core member in FIG. 8 and the valve core member in FIG. 1 are described in detail hereinafter. As shown in the figures, a connecting member 14' is also substantially a cylindrical-shaped structure, and a cross section of the connecting member 14' is ring-shaped. The connecting member 14' includes a first axial through hole 4', the connecting member 14' includes an upper section 146' and a lower section 148', and an outer diameter of the upper section 146' is greater than an outer diameter of the lower section 148'. A fifth positioning stepped portion 145 having a stepped face facing downward is defined by the upper section 146' and the lower section 148'. A lower end of the upper cylindrical body 12 is provided with a lower pressing portion 124'. After an upper end portion of the connecting member 14' abuts against the inner stepped portion 125, the lower pressing portion 124' is riveted to the fifth positioning stepped portion 145 or welded to the fifth positioning stepped portion 145, and thus the connection between the upper cylindrical body 12 and the connecting member 14' is realized. The upper end of the valve core body 11 is sleeved on a peripheral portion of the lower section 148' and is fixed to the lower section 148' by welding after the upper end of the valve core body 11 abuts against the fifth positioning stepped portion 145 of the connecting member 14'.

It can be known from the above structural design that, the valve core member 10 further includes a balancing flow path, and the balancing flow path includes a lower opening portion of the valve core body 11, the second chamber 3, the first axial through hole 4 of the connecting member 14, the first chamber 2, and the second axial through hole 15 of the upper cylindrical body 12. The arrangement of the balancing flow path facilitates the balance of upstream and downstream pressures of the valve core member 10, which is beneficial to reduce the differential pressure acting on the valve core member 10.

As shown in FIG. 1, in order to prevent radial displacement of the valve core member 10 during the process that the valve core member 10 moves axially with the nut 32, in the valve chamber 416, a valve core guide member 60 for guiding the valve core member 10 is provided on a peripheral portion of the valve core member 10. The valve core guide member 60 includes a guide sleeve 61 which is fixed to the lower cylinder portion 41c of the valve body 41 by welding. In a case that the electric valve is in a fully closed state, a seal assembly ensures that the radial connecting pipe 43 of the electric valve is not in communication with the valve port 200.

Specifically, as shown in FIGS. 1 and 7, the guide sleeve 61 is a cylindrical structure, which includes a guide portion 612 in clearance fit with an outer wall of the upper cylindrical body 12 for guiding the upper cylindrical body 12, and a mounting portion 613 located below the guide portion 612. Specifically, an inner wall of the guide portion 612, functioning as a guide face, is in clearance fit with the upper cylindrical body 12, so as to guide the valve core member 10. The mounting portion 613 is configured for mounting the seal assembly. The seal assembly includes an upper position-limiting member 67, a lower position-limiting member 64 and a sealing component. Specifically, a first positioning stepped portion 611 having a stepped face facing downward is formed between the guide portion 612 and the mounting portion 613, and an inner wall of the mounting portion 613 includes a second positioning stepped portion 615 having a stepped face facing downward. The upper position-limiting member 67 is sleeved on the periphery of the valve core body 11 and is arranged below the first positioning stepped portion 611, the upper end portion of the upper position-limiting member 67 abuts against the first positioning stepped portion 611, the lower position-limiting member 64 is sleeved on a periphery of the valve core body 11, and an upper end portion of the lower position-limiting member 64 abuts against the second positioning stepped portion 615 and is fitted to a lower end portion 614 of the guide sleeve 61 by riveting or fixed with the lower end portion 614 of the guide sleeve 61 by welding. The seal assembly is limited in the axial direction by the upper position-limiting member 67 and the lower position-limiting member 64, and the upper position-limiting member 67 and the lower position-limiting member 64 may specifically be metallic gaskets. Moreover, in a circumferential direction, the sealing component elastically abuts between an outer wall of a small-diameter portion 111 of the valve core body 11 and the inner wall of the mounting portion 613 of the guide sleeve 61. The sealing component includes a sealing member 62 made of a wear-resistant material and an elastic member 63 made of a rubber material, the sealing member 62 is specifically a sealing ring, and the elastic member 63 is specifically a slide sheet.

In order to further ensure the sealing performance, the valve core body 11 may be designed to be a cylinder structure having an upper portion with a relatively smaller diameter and a lower portion with a relatively greater diameter, the valve core body 11 includes the small-diameter portion 111 and the annular thin-wall portion 112 arranged below the small-diameter portion 111. A lower end portion of the annular thin-wall portion 112 forms a matching portion 100. An outer diameter of the small-diameter portion 111 of the valve core body 11 is defined as D1, and in a case that the matching portion 100 is an arc structure as shown in FIG. 6B, a diameter of the annular line at the bottom end 102 of the arc structure is defined as D2, then D1 is equal to or approximately equal to D2, which is equivalent to that, if the outer wall of the small-diameter portion 111 is extended downward, the outer wall of the small-diameter portion 111 is substantially coincident with the annular line at the bottom end 102 of the arc structure. With this arrangement, the differential pressure of the fluid acting on the matching portion 100 may be minimized, so that motions of opening and closing the valve are smoother and can be realized easily.

Alternatively, as shown in FIGS. 6C and 6D, in a case that the matching portion 100 is a circular truncated cone structure having a gradually decreasing diameter in a direction toward the valve port 200 (that is, having a decreasing diameter from top to bottom), a cross-section of the small-diameter portion 111 is defined as a sealing ring X, a diameter of the sealing ring X is defined as D3, a diameter of an outer annular line Y of the annular sealing face 102' is defined as D4, and a diameter of an inner annular line Z is defined as D5, then, D3 is equal to or approximately equal to half of D4+D5, that is, D3=(D4+D5)/2, or D3≈(D4+D5)/2. That is, an outer diameter of the outer wall of the small-diameter portion 111 is equal to or substantially equal to a diameter of a center annular line of the annular sealing face 102'.

Further, a difference between an outer diameter of the annular thin-wall portion 112 of the valve core body 11 and the outer diameter of the small-diameter portion 111 is less than or equal to 0.5 mm, such that an annular area of the annular thin-wall portion 112 protruding from the small-diameter portion 111 can be reduced as much as possible, thus reducing an external pressure difference, and thereby improving the motion performance of the valve. The electric valve can realize bidirectional flow, that is, the fluid can flow in via the radial connecting pipe 43 and flow out via the axial connecting pipe 23, and the fluid can also flow in via the axial connecting pipe 23 and flow out via the radial connecting pipe 43.

An example that the fluid flows in via the radial connecting pipe 43 and out via the axial connecting pipe 23 is described hereinafter. The magnetic rotor 34, driven by the coil member 70, may rotate clockwise or counterclockwise, so as to drive the nut 32 to move up and down in the axial direction. It can be set in a manner that the valve core member 10 moves toward the valve port 200 when the magnetic rotor 34 rotates clockwise, and the valve core member 10 moves away from the valve port 200 when the magnetic rotor 34 rotates counterclockwise. In a case that the electric valve is in a fully opened state shown in FIG. 1, the valve core member 10 is limited by the valve-core-limiting portion 52 and cannot continue moving up in the axial direction, the coil member 70 is energized to make the magnetic rotor 34 to rotate clockwise, the circumferential rotation of the magnetic rotor 34 is converted into the axial movement of the nut 32 through the screw rod 31, and thus the valve core member 10 is driven to move downward by the nut 32, a lower end of a lower extension portion 322 of the nut 32 abuts against the lower stop portion of the connecting member 14, and the matching portion 100 closes the valve port 200, that is, the electric valve is in a closed state. During operation of the electric valve, after the electric valve is de-energized, a torque of the magnetic rotor is transmitted to the nut 32 and the valve core member 10 through the screw rod 31, and thus a position of the valve core member 10 is maintained to close the valve. However, in actual operation of the electric valve, due to reasons such as vibration and the like, transmission threads between the screw rod 31 and the nut 32 may slip, causing failure of a locking force transmitted by the screw rod 31 to the nut 32 and the valve core member 10, resulting in that the valve cannot be closed effectively and thereby causing leakage problems.

To avoid the above problems, the nut 32 further includes the lower extension portion 322 arranged inside the first chamber 2, the lower extension portion 322 is cylindrical-shaped and includes an accommodating chamber 323, an elastic element is arranged in the accommodating chamber 323, one end of the elastic element abuts against the lower stop portion, and another end of the elastic element abuts against the nut 32. In this embodiment, the elastic element is specifically a compression spring 33. An elastic force of the spring ensures that the valve can be closed in this case.

In order to filter the fluid in the valve, a hole wall of the first axial through hole 4 of the connecting member 14 includes a sixth positioning stepped portion 149, and the valve core member 10 further includes a filter component 13 mounted at the sixth positioning stepped portion 149. The filter component 13 includes a filter member 131 and a support ring 132 configured for mounting the filter member 131. The compression spring 33 is sleeved on a periphery of the filter member 131. One end of the support ring 132 abuts against the compression spring 33, and another end of the support ring 132 abuts against the sixth positioning stepped portion.

In a case that the valve is required to be opened, the coil member 70 is energized to make the magnetic rotor 34 rotate counterclockwise, and the radial protruding portion 321 of the nut 32 abuts against the upper stop portion of the valve core body 11, so that the nut 32 can drive the valve core member 10 to move upward in the axial direction until the transverse bending portion 121 of the valve core member 10 abuts against the valve-core-limiting portion 52 of the nut sleeving member 50, and thus achieving the fully opened state shown in FIG. 1.

A method for manufacturing the electric valve is described hereinafter, and the method includes the following steps:

S1, providing the upper cylindrical body 12;

S2, assembling the nut 32, the upper cylindrical body 12 and the connecting member 14: the radial protruding portion 321 is limited in the first chamber 2 by the upper stop portion, and the lower end portion of the upper cylindrical body 12 is fixed with the connecting member 14 by riveting or welding;

S3, providing the valve core body 11 and the seal assembly, sleeving the seal assembly on the periphery of the small-diameter portion 111, and fixing the upper end portion of the small-diameter portion to the connecting member by welding;

S4, providing the guide sleeve, and fixing the guide sleeve to the valve body by welding, to form a second fitting assembly;

S5, connecting the nut with the screw rod by threaded connection, and fixing the lower end portion of the guide sleeve to the seal assembly by riveting or welding;

S6, providing the valve seat core and the valve seat body, mounting the valve seat core to an upper positioning stepped portion and fixing the valve seat core to the upper end of the valve seat body by riveting; and S7, fixing the valve body 41 to the valve seat body 21 by welding.

It should be noted that, the step numbers of S1 to S7 described above are only for convenience of illustration and do not represent a necessary order of the steps.

In Step S1, the third positioning stepped portion having a stepped face facing downward is machined on an inner wall of the lower end portion of the upper cylindrical body. Step S2 further includes the following steps: forming the nut by injection molding of a plastic material, wherein the nut includes the lower extension portion arranged below the radial protruding portion. In Step S2, the connecting member includes the ring-shaped upper section, the ring-shaped intermediate section and the ring-shaped lower section, the outer diameter of the upper section is greater than that of the intermediate section, the outer diameter of the intermediate section is greater than that of the lower section, the upper end face of the upper section abuts against the third positioning stepped portion, and the lower end portion of the upper cylindrical body is fixed to the lower end face of the upper section by riveting or welding. In Step S3, the valve core body is sleeved on the outer wall of the lower section, the upper end of the valve core body abuts against the lower end face of the intermediate section and is fixed to the outer wall of the lower section by welding.

According to the electric valve of the present solution, the valve core member is designed in a segmented manner. The valve core member includes the upper cylindrical body, the valve core body and the connecting member. The upper cylindrical body and the valve core body may be formed by drawing or stamping as required, and the connecting member may be manufactured by metal forming. The forming process is flexible. Moreover, the lower stop portion cooperating with the nut is directly arranged on the connecting member, and no additional parts are required to form the lower stop portion. The upper cylindrical body includes the first chamber, the valve core body includes the second chamber, the connecting member includes the first axial through hole which allows the first chamber and the second chamber to be in communication with each other, and the valve core body includes the annular thin-wall portion which abuts against or be separated from the sealing portion of the valve seat core, which can reduce the differential pressure acting on the valve core member, facilitate the internal pressure balance of the valve, and thereby improving the motion performance of the valve.

The electric valve and the method for manufacturing the same according to the present application are described in detail hereinbefore. The principle and the embodiments of the present application are illustrated herein by specific examples. The above description of examples is only intended to help the understanding of the method and the spirit of the present application. It should be noted that, for those skilled in the art, a few of modifications and improvements may be made to the present application without departing from the principle of the present application, and these modifications and improvements are also deemed to fall into the scope of the present application defined by the claims.

What is claimed is:

1. An electric valve, comprising:
a valve body member, wherein the valve body member comprises a valve body, and the valve body is provided with a first fluid port;
a valve seat member, wherein the valve seat member is fixedly connected to the valve body member, the valve seat member comprises a valve seat body, and the valve seat body is provided with a second fluid port;
a transmission member, wherein the transmission member is arranged in a valve chamber of the electric valve, the transmission member comprises a screw rod and a nut, and the screw rod is in threaded connection with the nut;
a valve core member, wherein the valve core member is arranged in the valve chamber, and the valve core member comprises an upper cylindrical body, a valve core body, and a connecting member fixedly connected with the upper cylindrical body and the valve core body; and wherein
the upper cylindrical body comprises a first chamber, and an upper end portion of the upper cylindrical body comprises an upper stop portion; the valve core body is tubular-shaped and comprises an annular thin-wall portion, the valve core body further comprises a second chamber, an upper end portion of the connecting member faces the first chamber, and a lower end portion of the connecting member faces the second chamber; the nut comprises a radial protruding portion arranged in the first chamber, and the radial protruding portion is configured to cooperate with the upper stop portion, to allow the nut to drive the valve core member to move in an axial direction; the connecting member is provided with a first axial through hole in communication with the first chamber and the second chamber, the upper end portion of the connecting member comprises a lower stop portion, the annular thin-wall portion is configured to abut against a sealing portion of the valve seat member, and a lower end portion of the nut is configured to cooperate with the lower stop portion, to prevent the nut from moving downward;
wherein the electric valve further comprises a valve core guide member,
wherein the valve core guide member comprises a guide sleeve, the guide sleeve is substantially tubular-shaped, and the guide sleeve is fixedly connected to the valve body member;
an outer wall of the upper cylindrical body is in clearance fit with an inner wall of the guide sleeve, an outer diameter of the upper cylindrical body is greater than an outer diameter of the valve core body, the guide sleeve comprises a guide portion which is in clearance fit with the upper cylindrical body, the guide sleeve further comprises a mounting portion, and an inner diameter of the mounting portion is less than an inner diameter of the guide portion;
a seal assembly is arranged between an inner wall of the mounting portion and an outer wall of the valve core body, the seal assembly comprises a sealing component sleeved on a peripheral portion of the valve core body, and the sealing component is elastically abutted between the inner wall of the mounting portion and the outer wall of the valve core body.

2. The electric valve according to claim 1, wherein the seal assembly further comprises an upper position-limiting member arranged above the sealing component and a lower position-limiting member arranged below the sealing component, and the upper position-limiting member and the lower position-limiting member are sleeved on the peripheral portion of the valve core body; a first positioning stepped portion having a stepped face facing downward is defined by the guide portion together with the mounting portion, the inner wall of the mounting portion further comprises a second positioning stepped portion having a stepped face facing downward, an upper end portion of the upper position-limiting member abuts against the first positioning stepped portion, an upper end portion of the lower position-limiting member abuts against the second positioning stepped portion, and the lower position-limiting member is fitted to a lower end portion of the guide sleeve by riveting or fixed with the lower end portion of the guide sleeve by welding.

3. The electric valve according to claim 1, wherein the upper cylindrical body is an integral structure, the upper cylindrical body is integrally formed by drawing or stamping a metal material, the upper cylindrical body comprises a body portion and a transverse bending portion extending radially from an upper end of the body portion, a lower end face portion of the transverse bending portion is configured to serve as the upper stop portion, the transverse bending portion comprises a second axial through hole, the nut is arranged to run through the second axial through hole, and a lower end portion of the body portion is fixed with the connecting member by welding or fitted to the connecting member by riveting.

4. The electric valve according to claim 3, wherein a cross section of the connecting member is annular, the connecting member comprises an upper section, an intermediate section and a lower section, and outer diameters of the upper section, the intermediate section and the lower section are decreased in sequence; at an outer wall of the connecting member, a third positioning stepped portion having a stepped face facing downward is defined by the upper section together with the intermediate section, and a fourth positioning stepped portion having a stepped face facing downward is defined by the intermediate section together with the lower section; a lower end portion of the upper cylindrical body is fitted to the third positioning stepped portion by riveting or fixed with the third positioning stepped portion by welding, an upper end portion of the valve core body is sleeved on a periphery of the lower section, and the upper end portion of the valve core body abuts against the fourth stepped portion and is fixed with the lower section by welding.

5. The electric valve according to claim 3, wherein a cross section of the connecting member is ring-shaped, the connecting member comprises an upper section and a lower section, and outer diameters of the upper section and the lower section are decreased in sequence, at an outer wall of the connecting member, a fifth positioning stepped portion having a stepped face facing downward is defined by the upper section together with the lower section, a lower end portion of the upper cylindrical body is fitted to the fifth positioning stepped portion by riveting or fixed with the fifth positioning stepped portion by welding, the valve core body is sleeved on a periphery of the lower section, and an upper end portion of the valve core body abuts against the fifth positioning stepped portion and fixed with the fifth positioning stepped portion by welding.

6. The electric valve according to claim 1, wherein the nut further comprises a lower extension portion arranged in the first chamber, the lower extension portion is tubular-shaped, the lower extension portion comprises an accommodating chamber, the accommodating chamber is provided with a compression spring, one end of the compression spring abuts against the nut, and another end of the compression spring abuts against the lower stop portion.

7. The electric valve according to claim 1, wherein the valve seat member comprises the valve seat body which is fixedly connected to the valve body member, and the valve seat body is provided with a third axial through hole; an upper end face portion of the valve seat body comprises an upper stepped portion having a stepped face facing upward, a valve seat core is fixed to the upper stepped portion, the valve seat core is made of plastic, an upper end face portion of the valve seat core is configured to form the sealing portion, the annular thin-wall portion comprises a matching portion, the matching portion is an arc structure, and a bottom end of the arc structure is configured to abut against or be separated from the sealing portion.

8. The electric valve according to claim 7, wherein the valve core body comprises a small-diameter portion and the annular thin-wall portion arranged below the small-diameter portion, a seal assembly is sleeved on a peripheral portion of the small-diameter portion, an outer diameter and an inner diameter of the annular thin-wall portion are greater than an outer diameter and an inner diameter of the small-diameter portion, respectively, and an outer diameter of the small-diameter portion of the valve core body is equal to a diameter of an annular line at the bottom end of the arc structure.

9. The electric valve according to claim 8, wherein a difference between the outer diameter of the annular thin-wall portion and the outer diameter of the small-diameter portion is less than or equal to 0.5 mm.

10. The electric valve according to claim 1, wherein the valve seat body is fixedly connected with the valve body member, the valve seat body is provided with a third axial through hole, an upper end face portion of the valve seat body comprises an upper stepped face facing upward, a valve seat core is fixed to the upper stepped portion, the valve seat core is made of plastic, an upper end face portion of the valve seat core is configured to form the sealing portion, the annular thin-wall portion comprises a matching portion, the matching portion is a circular truncated cone structure having a diameter decreasing from top to bottom, a lower end face of the circular truncated cone structure forms an annular sealing face, and the annular sealing face is configured to abut against or be separated from the sealing portion.

11. The electric valve according to claim 10, wherein the valve core body comprises a small-diameter portion and the annular thin-wall portion arranged below the small-diameter portion, a seal assembly is sleeved on a peripheral portion of the small-diameter portion, an outer diameter and an inner diameter of the annular thin-wall portion are greater than an outer diameter and an inner diameter of the small-diameter portion, respectively, and an outer diameter of the small-diameter portion of the valve core body is equal to a diameter of a central annular line of the annular sealing face.

12. The electric valve according to claim 11, wherein a difference between an outer diameter of the annular thin-wall portion and an outer diameter of the small-diameter portion is less than or equal to 0.5 mm.

13. The electric valve according to claim 1, wherein the valve seat body is fixedly connected with the valve body member, the valve seat body is provided with a third axial through hole, an upper end face portion of the valve seat body comprises an upper stepped portion having a stepped face facing upward, a valve seat core is fixed to the upper stepped portion, the valve seat core is made of plastic, the valve seat core comprises a ring-shaped base portion and a ring-shaped protrusion extending upward from an upper end portion of the base portion, an outer diameter of the protrusion is less than an outer diameter of the base portion, and the sealing portion is formed by an upper end face portion of the protrusion; a valve port sheath is arranged at the third axial through hole, an outer wall of the valve port sheath abuts against an inner wall of the valve seat core and is fixed with an inner wall of the valve seat body by welding, and the valve port sheath is configured to protrude out of the sealing portion in the axial direction.

14. The electric valve according to claim 1, wherein a hole wall of the first axial through hole comprises a sixth positioning stepped portion, a filter component is mounted at the sixth positioning stepped portion, the filter component comprises a support ring and a filter member, an elastic element is sleeved on a periphery of the filter member, one end of the support ring abuts against the elastic element, and another end of the support ring abuts against the sixth positioning stepped portion.

15. A method for manufacturing the electric valve according to claim 1, comprising the following steps:
   S1, providing the upper cylindrical body: forming the hollow upper cylindrical body by using an integral forming method of drawing or stamping a metal material, wherein the upper end portion of the upper cylindrical body comprises the upper stop portion;
   S2, assembling the nut, the upper cylindrical body and the connecting member: allowing the radial protruding portion to be limited in the first chamber by the upper stop portion, and fixing a lower end portion of the upper cylindrical body to the connecting member by riveting or welding;
   S3, providing the valve core body and a seal assembly, wherein the valve core body comprises a small-diameter portion and the annular thin-wall portion arranged below the small-diameter portion, the small-diameter portion is substantially tubular-shaped, and an inner diameter and an outer diameter of the annular thin-wall portion are greater than an inner diameter and an outer diameter of the small-diameter portion, respectively; sleeving the seal assembly on a peripheral portion of the small-diameter portion, and fixing an upper end portion of the small-diameter portion to the connecting member by welding;

S4, providing a guide sleeve, and fixing the guide sleeve to the valve body by welding, to form a second fitting assembly;

S5, connecting the nut with the screw rod by threaded connection, and fixing a lower end portion of the guide sleeve to the seal assembly by riveting or welding;

S6, providing a valve seat core having the sealing portion and the valve seat body made of a metal material, wherein an upper end face portion of the valve seat body is machined to form an upper positioning stepped portion having a stepped face facing upward, and the upper positioning stepped portion is configured for mounting the valve seat core; and mounting the valve seat core at the upper positioning stepped portion and fixing the valve seat core to an upper end of the valve seat body by riveting; and S7, fixing the valve body with the valve seat body by welding.

16. The method according to claim 15, wherein the step S2 further comprises the following steps: forming the nut by performing injection molding to a plastic material, to allow a lower extension portion to be formed below the radial protruding portion and an accommodating chamber to be machined in the lower extension portion; mounting an elastic element in the accommodating chamber, to allow one end of the elastic element to abut against the nut, and another end of the elastic element to abut against the lower stop portion of the connecting member.

17. The method according to claim 15, wherein the step S1 further comprises: forming inner stepped portion on an inner wall of the lower end portion of the upper cylindrical body; the step S2 further comprises: forming a ring-shaped upper section, a ring-shaped intermediate section and a ring-shaped lower section of the connecting member, wherein an outer diameter of the upper section is greater than an outer diameter of the intermediate section, the outer diameter of the intermediate section is greater than an outer diameter of the lower section, an upper end face of the upper section abuts against the inner stepped portion, and the lower end portion of the upper cylindrical body is fixed with a lower end face of the upper section by riveting or welding; and the step S3 further comprises: sleeving the valve core body on an outer wall of the lower section, to allow an upper end of the valve core body to abut against a lower end face of the intermediate section and be fixed with an outer wall of the lower section by welding.

\* \* \* \* \*